UNITED STATES PATENT OFFICE.

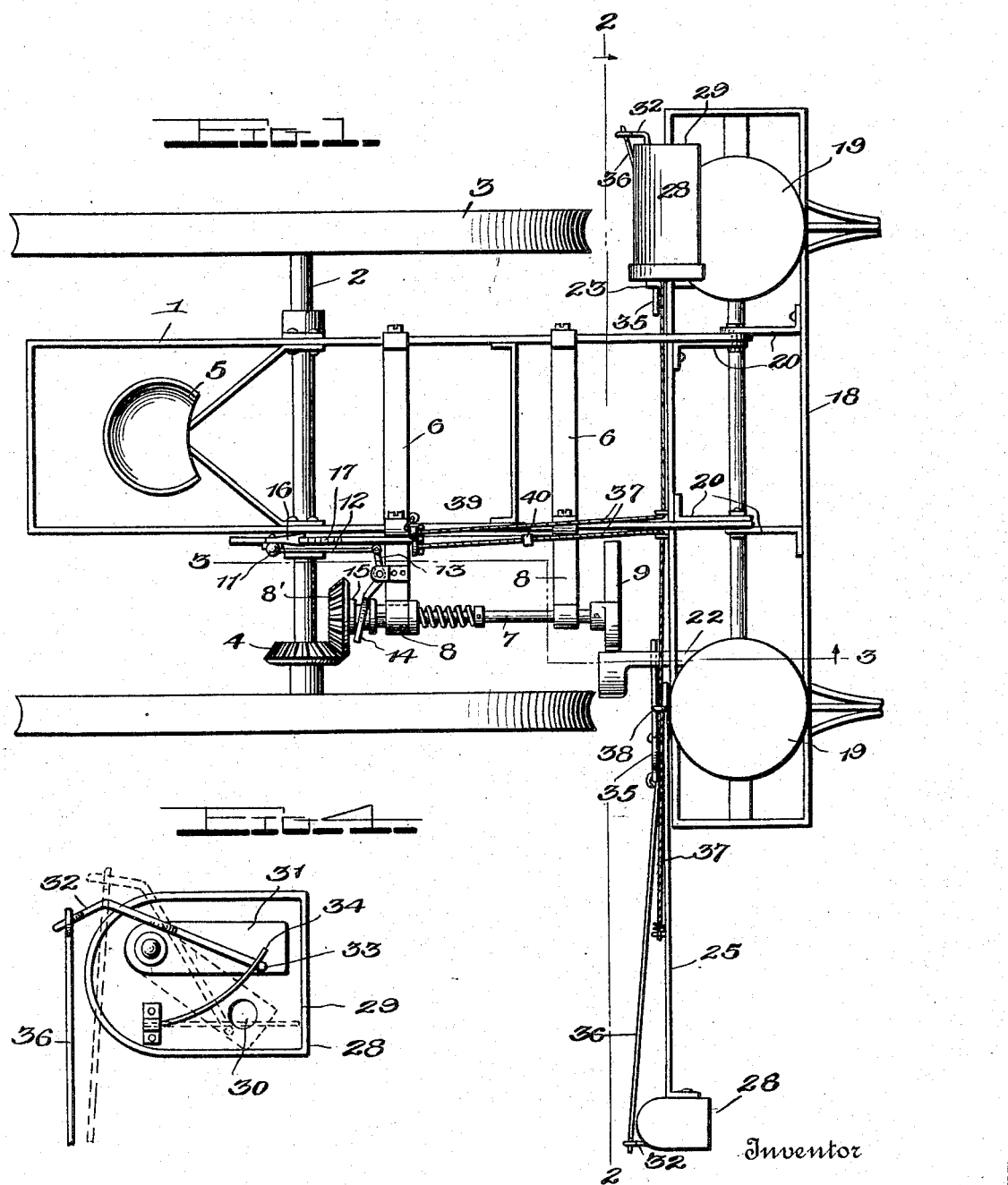

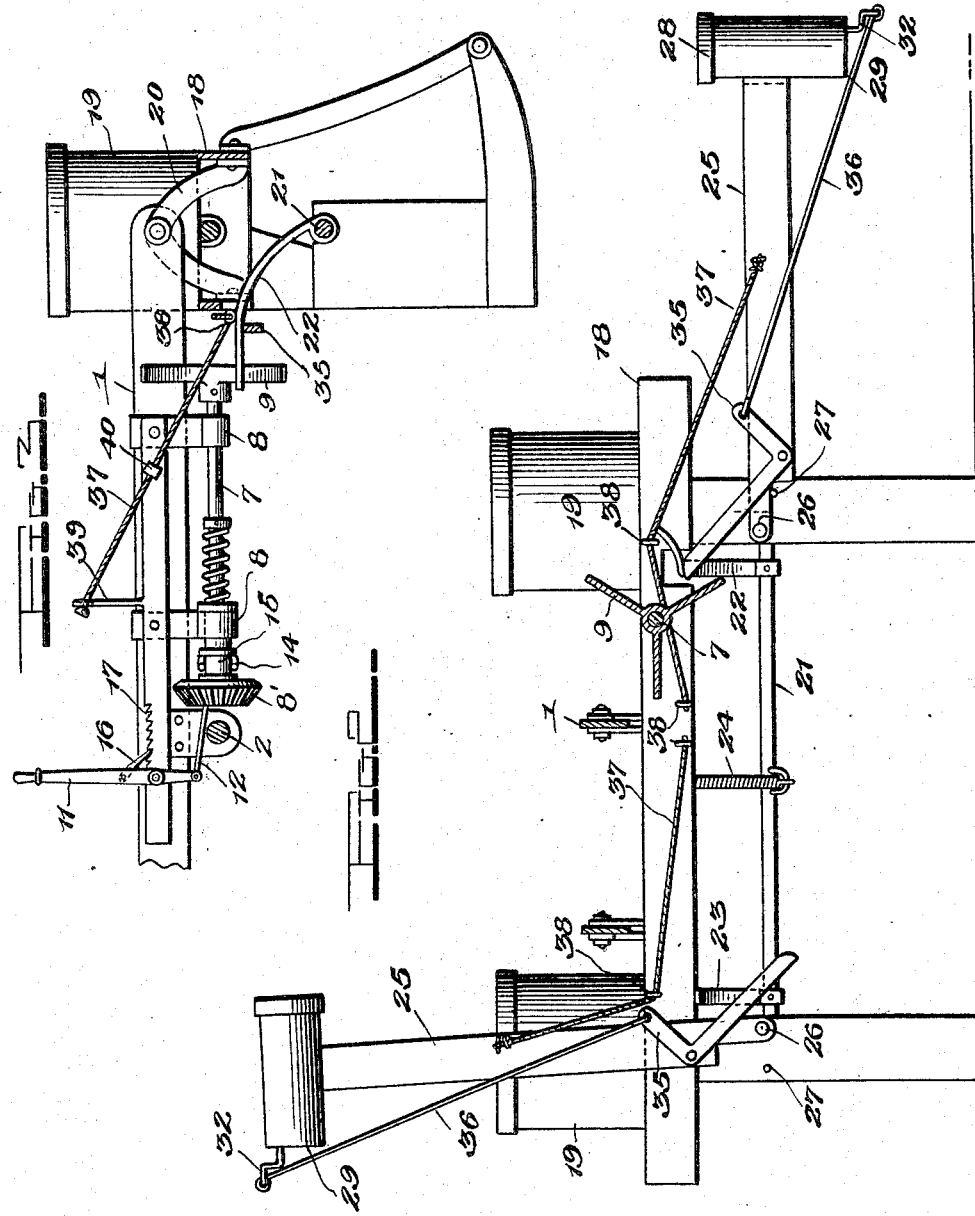

FRANK A. JOHNSON, OF DANVILLE, ILLINOIS, ASSIGNOR OF ONE-HALF TO JOHN ROSS, OF DANVILLE, ILLINOIS.

PLANTING-MACHINE.

1,186,795.     Specification of Letters Patent.     Patented June 13, 1916.

Application filed January 6, 1916. Serial No. 70,652.

*To all whom it may concern:*

Be it known that I, FRANK A. JOHNSON, a citizen of the United States, residing at Danville, in the county of Vermilion and State of Illinois, have invented certain new and useful Improvements in Planting-Machines; and I do declare the following to be a full, clear, and exact description of the invention, such as will enable others skilled in the art to which it appertains to make and use the same.

This invention relates to new and useful improvements in planters, and more particularly to that class of planters employed for planting seed at predetermined intervals, the invention being particularly applicable to planting corn, and like seed.

One object of the invention is to provide a check row corn planter which does away with the necessity of providing a wire to operate the same.

Another object of the invention is to provide a planter of this character which is provided with a marker, which consists of a receptacle containing a marking powder and provided with means for dropping a quantity of said powder at a certain point at predetermined intervals.

A still further object of this invention is to provide a planter having a marking device which is operated by the same means which operate the seed dropping mechanism, but which is only operable when the marker is placed in a certain position controlled by the operator of the machine.

With these and numerous other objects in view, my invention consists of the novel features of construction, combination, and arrangement of parts which will be herein referred to and more particularly pointed out in the specification and claims.

In the accompanying drawings: Figure 1 is a top plan view of my improved planting machine; Fig. 2 is a transverse section taken on the line 2—2 of Fig. 1; Fig. 3 is a longitudinal section taken on the line 3—3 of Fig. 1; and Fig. 4 is a detail view of the bottom of the marker proper, showing the valve which controls the outlet of the same.

In describing my invention, I shall refer to the drawings in which similar reference characters designate corresponding parts throughout the several views, and in which the numeral 1 designates the main frame of my device which is supported by an axle 2 on which are mounted wheels 3. Keyed to the axle 2 adjacent one of the wheels 3 is a bevel gear 4, which is adapted to rotate upon movement of the wheels. The main frame 1 of the machine is substantially U-shaped, and supports thereon a seat 5 which carries the operator of the machine. This frame 1 has its front end open and is supported by a plurality of braces 6 as clearly shown in Fig. 1 of the drawings.

Mounted adjacent one side of the frame 1, and between the same and one of the wheels 3, is a longitudinally extending shaft 7 which is rotatably mounted in bearings 8 which project laterally from the side of the frame. This shaft 7 has mounted on one end of the same a bevel gear 8′ which is adapted to mesh with the bevel gear 4 which is secured to the axle of the machine. On the other end of the shaft 7 is mounted a tappet wheel 9 for a purpose to be hereinafter more fully described. This rotatable shaft 7 is movable longitudinally in the bearings 8, and is normally positioned, having its bevel gear 8′ intermeshed with the bevel gear 4, by means of a coiled spring which is mounted thereon. This longitudinally extending shaft 7 is movable at the control of the operator of the machine by means of a hand operating lever 11 which is fulcrumed to a portion of the frame, and has projecting from its lower end a lever 12 which is connected with the arm 13 fulcrumed intermediate its ends to one of the bearings 8, and having a forked outer end 14 which engages a grooved collar 15 securely mounted on the shaft 7 adjacent the beveled gear 8′. By this means, upon movement of the hand lever 11 through the above described connection, the shaft 7 will be longitudinally movable in the bearings 8, and consequently the bevel gear 8′ may be moved into and out of engagement with the gear 4 on the axle 2 of the machine. The hand lever 11 may be held in various positions by means of a pawl 16 secured thereon and is adapted to engage a rack 17 which is secured to the frame, and upon which the said lever is likewise fulcrumed.

Pivotally mounted on the front end of the main frame 1 is a transversely extending supplemental frame 18 which is substantially of rectangular shape and supports therein a pair of seed containing hoppers 19 which are disposed substantially in the path of the wheels 3. This frame 18 is suspended from and pivotally connected with the front end of the main frame 1 by a pair of arcuate arms 20, as clearly shown in Figs. 1 and 2 of the drawings. Positioned beneath the seed containing hoppers or receptacles 19, are the usual type of seed planting boots which are connected therewith by a seed dropping mechanism which is operable by a transversely extending shaft 21 mounted in the frame 18. This transversely extending shaft 21 has projecting laterally therefrom beneath the seed containing hoppers and extending to the rear of the machine, a pair of arms 22 and 23. The seed dropping mechanism is so arranged in conjunction with this shaft that upon any movement of the same, a certain predetermined quantity of seed will be allowed to drop from the hoppers into the boot, and it will be consequently planted in the ground. Mounted on the shaft 21 and connecting the same with one side of the frame 18, is a coiled spring 24 which is adapted to return the shaft to its normal position, when the same is rocked to plant a certain quantity of seed.

The seed dropping mechanism of this machine is operated by means of the laterally projecting arm 23 being positioned in the path of the movement of the tappet wheel 9, so that when the same is rotated, the tappets thereon will depress said arm, and consequently rock the transversely extending shaft 21 to drop the certain predetermined quantity of seed, as has been heretofore described. As soon as the arm 22 is released from the tappet, the same will be returned to its original position by means of the coiled spring 24.

The marking feature of my invention consists of a pair of vertically swinging arms 25 which are fulcrumed at their inner ends to the rear of the seed dropping mechanism, and are adapted to project laterally from either side of the pivoted frame 18. For the sake of brevity, and owing to the fact that these two arms are alike in structure, I am specifically describing but one of them. The arm 25 is fulcrumed at its inner end 26 to the rear of the seed dropping mechanism, and is adapted to swing from its normally upright position down to a horizontal position for a purpose to be hereinafter more fully described. The arm 25 is held in horizontal position by means of a stop 27 on the seed dropping mechanism, as clearly shown in Fig. 2 of the drawings. The outer end of the arm 25 has secured thereon a receptacle 28 which is adapted to contain a quantity of powder which is used for marking purposes. This receptacle 28 is secured to the outer extremity of the end of the arm 25 by any desired means, for instance as shown in Fig. 1 of the drawings, the same being riveted thereto. This receptacle 28 may be of any desired size or shape and is adapted to have one end 29 which will be the bottom of the same when the arm is in horizontal position, formed with an outlet 30 therein. This outlet 30 is normally covered by a pivoted slide member 31 which has an operating arm 32 secured thereto, with an upturned end 33 which coacts with the spring 34 which normally tends to hold the slide member 31 over the outlet 30, and consequently will prevent any of the powder contained in the receptacle from dropping therefrom, when the receptacle is positioned as shown in Fig. 1 of the drawings.

Pivoted to the arm 25 adjacent its inner end, is a bell crank lever 35 which has its longest end positioned beneath the laterally projecting arm 22 of the transversely extending shaft 21, when the swinging arm is in horizontal position, as clearly shown in Fig. 1 of the drawings. The other end of this bell crank lever 25 is connected by a link 36 with the outer end of the operating lever 32 which controls the movement of the pivoted slide 31 which covers the outlet in the bottom of the receptacle 28. It will be obvious that upon movement of the bell crank lever 35, through the medium of the connecting link 36, the operating lever 32 will be moved laterally, and consequently the slide 31 will be moved from over the outlet 30 and a certain quantity of powder will be discharged from the receptacle. As soon as the bell crank lever 35 is released, the same will be returned to its normal position, owing to the fact that the spring 34 will act upon the operating lever 32 and move the slide 31 once more over the outlet 30 and cut off the discharge of powder from the receptacle.

The swinging arm 25 is movable through the medium of a cord or cable 37 which is connected with the said arm at one end, and is guided by suitable guiding means 38 back to the main frame 1, where its opposite end is supported in a hook member 39 disposed within easy reach of the operator of the machine. The cord or cable 37 has positioned thereon a stop 40, which is adapted to engage the hook 39 to hold the swinging arm 25 in upright position. When it is desired to lower the arm, the stop 40 is disengaged from the hook 39, and the arm will swing by gravity down to the horizontal position shown in Fig. 1 of the drawings. This cord or cable and the structure incidental thereto forms a very easy and efficient means for quickly raising and lowering the swinging arm, so that the marking device of this machine may be moved in and out of operative position in a simple and efficient manner.

The use of this type of marker in a machine of this character is too well known to make it necessary for further amplification or description of the same, and it is sufficient to say that when the parts of this device are assembled and it is desired to operate the marker, the swinging arm is dropped to horizontal position as shown in Fig. 2 of the drawings, whereby the bell crank lever 35 will have its longest end positioned directly below the laterally projecting arm 22 of the seed dropping operating shaft 21, which arm is positioned directly in the path of the tappet wheel 9 which is mounted on the main frame of the machine. Consequently, when the machine is being operated and the tappet wheel revolved, upon depression of the laterally projecting arm 22 caused by one of the tappets of the wheel 9 engaging the same, the bell crank lever 35 will be moved downwardly, and owing to the connecting link 36 between the said lever and the lever which controls the slide 31 on the bottom of the receptacle 28, the said slide will be moved and a certain quantity of the marking powder will be discharged from the receptacle. As soon as the tappet is released from the arm 22, the same will be returned to its normal position and the bell crank lever 35 will be released by the same; hence the pull will be removed from the operating shaft 32 which controls the slide over the outlet in the bottom of the receptacle, and the spring 34 will return the slide to normally closed position, cutting off the discharge of powder from said receptacle. This operation, however, which takes place simultaneously with the discharge of a certain quantity of seed into the planting boots, will discharge at the same time a pile of marking powder, for the purpose of which is obvious to those skilled in the use and operating of planting machines of this character.

The seed dropping mechanism of this device is operable by means of the longitudinally extending rotatable shaft 7 mounted alongside the main frame 1, having its bevel gear 8′ moved into engagement with the bevel gear 4 on the axle of the machine, by means of the operating lever 11 which is connected therewith. This intermeshing of the gears 4 and 8′ will rotate the shaft 7, and consequently the tappet wheel 9, whereby the tappets on the same will depress the arm 22, and rock the transversely extending shaft 21 a sufficient distance to allow a certain amount of seed to be discharged from the hoppers 19 into the seed dropping boots or planters. As soon as the tappet which depresses the arm 22 has moved from out of engagement with the same, the arm will be returned to its original position through the medium of the coiled spring 24, which will return the shaft 21. This shaft 21 is provided with an arm 23 as well as the arm 22 and which is fixedly mounted thereon and projects laterally from the same, and which will depress the bell crank lever on the swinging shaft that carries the marker, when the said marker on that side of the machine is disposed in operative position.

From the foregoing description of the construction of my improved planting machine and marking attachment, the manner of applying the same to use, and the operation thereof will be readily understood, and it will be seen that I have provided a simple, inexpensive, and efficient means for carrying out the objects of the invention.

I claim:

1. The combination with a seed dropping mechanism including an operating shaft having an arm projecting laterally therefrom, means to depress said arm at predetermined intervals to operate said shaft; of a vertically swinging arm carrying a marker, a bell crank lever on said arm operable by the laterally projecting arm when the marker carrying arm is in horizontal position, and a connecting link between said lever and the marker.

2. The combination with a seed dropping mechanism including an operating shaft having an arm projecting laterally therefrom, means to depress said arm at predetermined intervals to operate said shaft; of a vertically swinging arm pivoted at one end to the said mechanism and swinging outwardly therefrom, a receptacle on the other end of said arm having an outlet, a valve for said outlet, a bell crank lever pivoted to said arm adjacent its fulcrumed end, a link connecting one end of said lever and the valve, and the other end of said lever being positioned beneath the laterally projecting arm when the swinging arm is in horizontal position.

3. The combination with a seed dropping mechanism including an operating shaft having an arm projecting laterally therefrom, means to depress said arm at predetermined intervals to operate said shaft; of a vertically swinging arm fulcrumed at its inner end to said mechanism, means to raise and lower said arm, a receptacle on the outer end of said arm, a normally closed slide valve over an outlet in said receptacle, and coacting means between the laterally projecting arm and said valve when the swinging arm is in horizontal position to operate the valve to discharge a marking powder upon depression of the laterally projecting arm.

4. The combination with a seed dropping mechanism including an operating shaft having an arm projecting laterally therefrom, means to depress said arm at predetermined intervals to operate said shaft; of a vertically swinging arm, a receptacle on said arm having an outlet, a pivoted slide member to close the same, a lever to operate said member, a spring to normally hold the same in closed position and means on said arm connected with the operating lever to move the same to open the slide upon depression of the laterally projecting arm.

5. The combination of a seed dropping mechanism, a movable element actuated simultaneously with said mechanism, a vertically swinging arm carrying a marker, and a mechanism for actuating the marker mounted on said arm and including a member disposed in the path of said element when the marker is in lowered operative position, and moved out of the path of said element when the arm is elevated.

6. The combination of a seed dropping mechanism, a movable element actuated simultaneously with said mechanism, a vertically swinging arm, a valved receptacle on the outer end of the arm to contain a marking substance, a lever mounted on the inner end of the arm and movable into and out of the path of movement of said element as the arm is lowered and raised, and operative connections between said lever and the valve of said receptacle.

In testimony whereof I have hereunto set my hand in presence of two subscribing witnesses.

FRANK A. JOHNSON.

Witnesses:
S. E. PERKINS,
JOHN ROSS.

Copies of this patent may be obtained for five cents each, by addressing the "Commissioner of Patents, Washington, D. C."